June 22, 1948.     C. L. KNOTT     2,443,682
EYELETING MACHINE
Filed Dec. 20, 1944     5 Sheets-Sheet 1
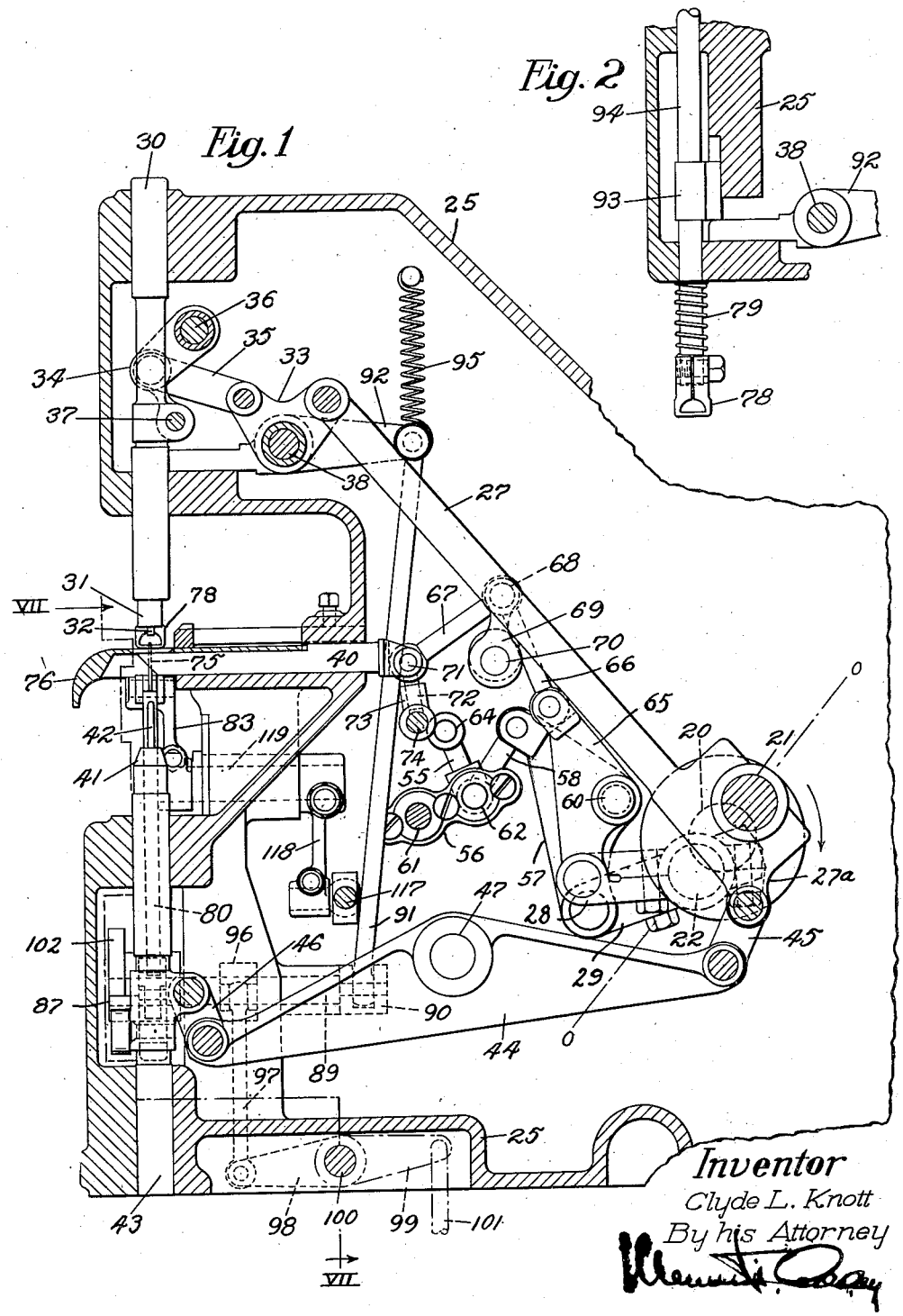
Inventor
Clyde L. Knott
By his Attorney

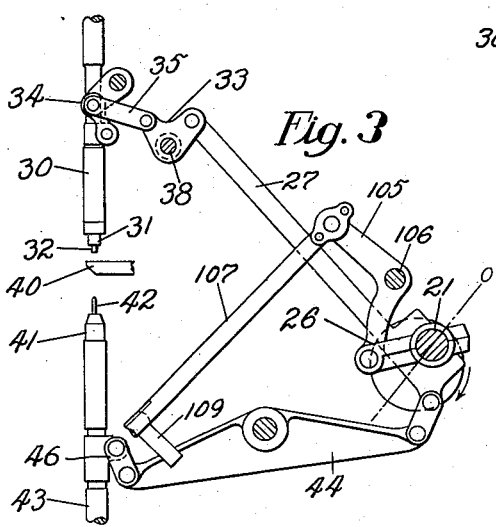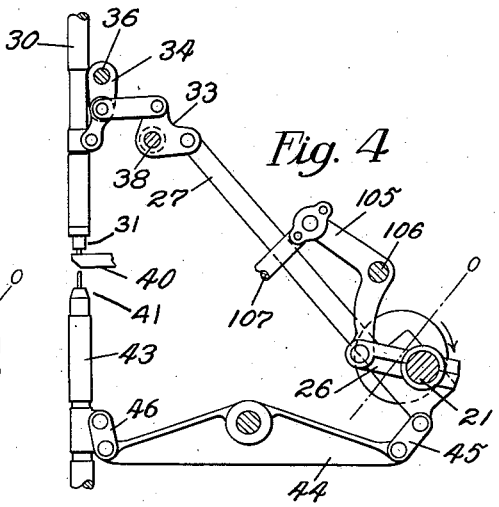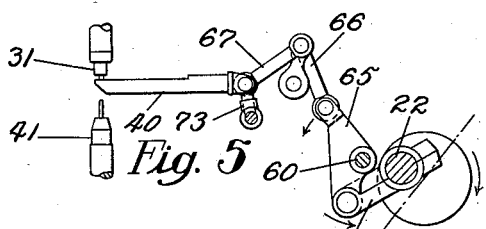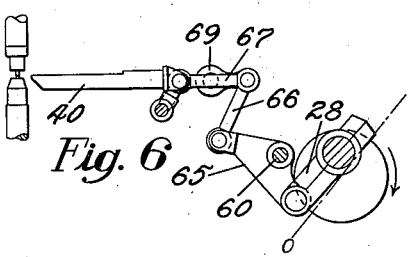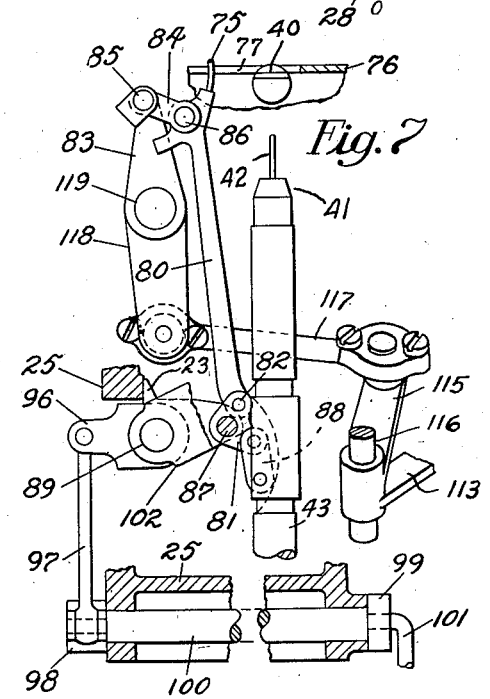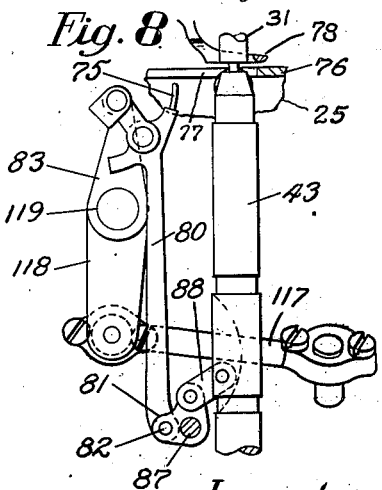

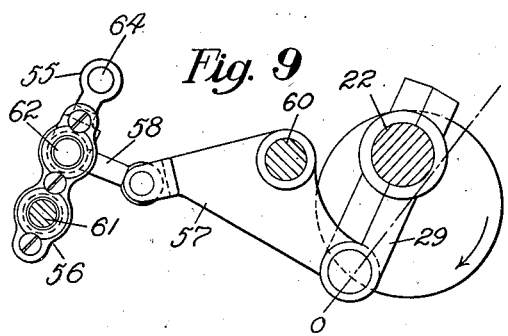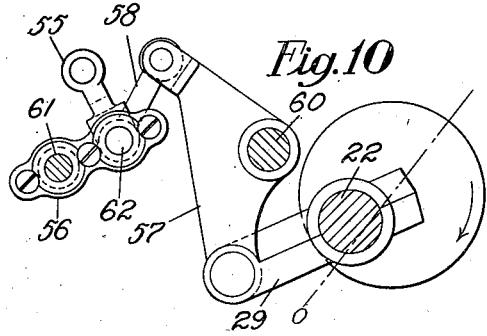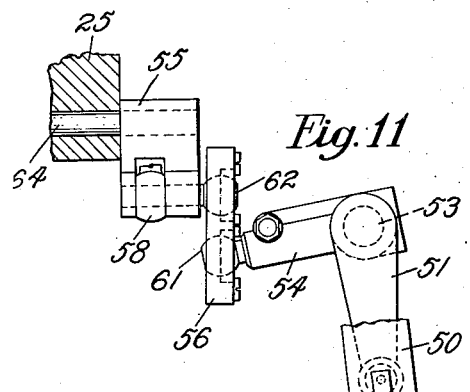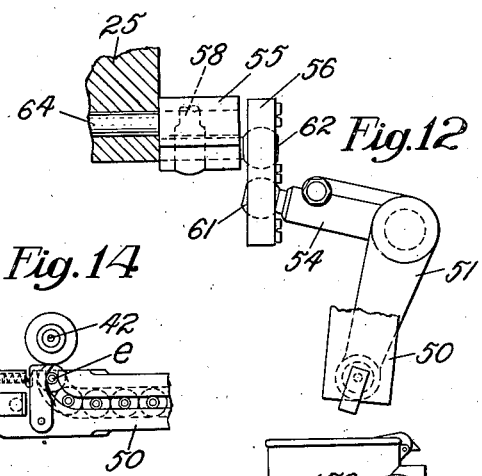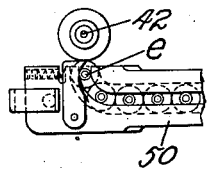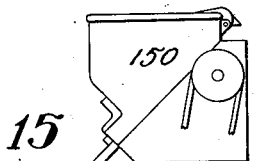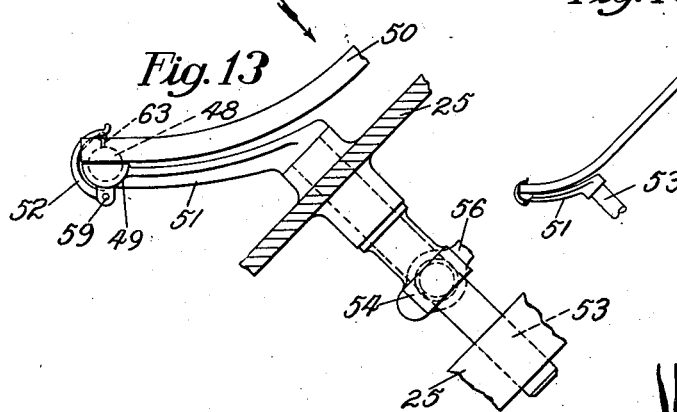

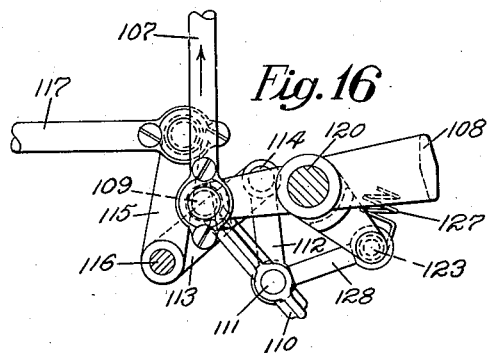
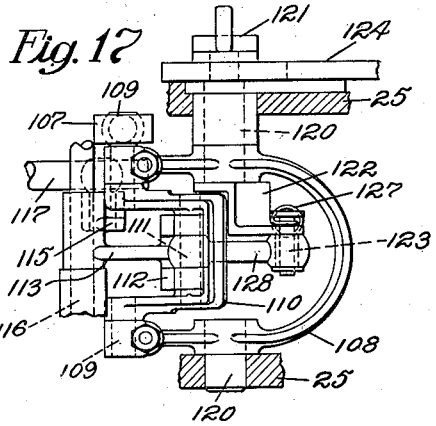
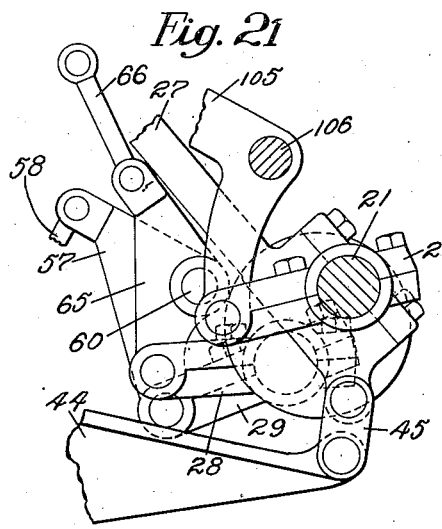
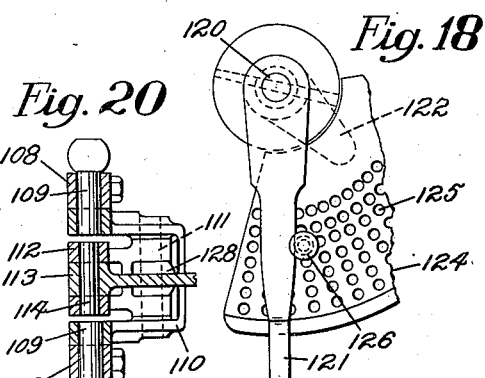
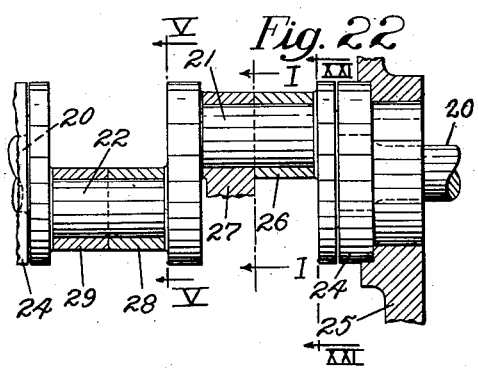
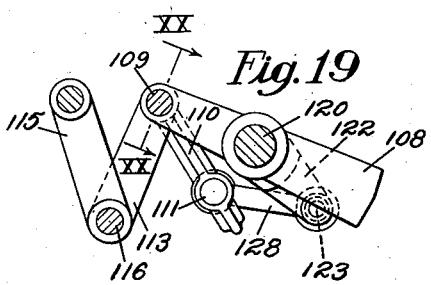
Inventor
Clyde L. Knott
By his Attorney June 22, 1948.    C. L. KNOTT    2,443,682
EYELETING MACHINE
Filed Dec. 20, 1944    5 Sheets-Sheet 5
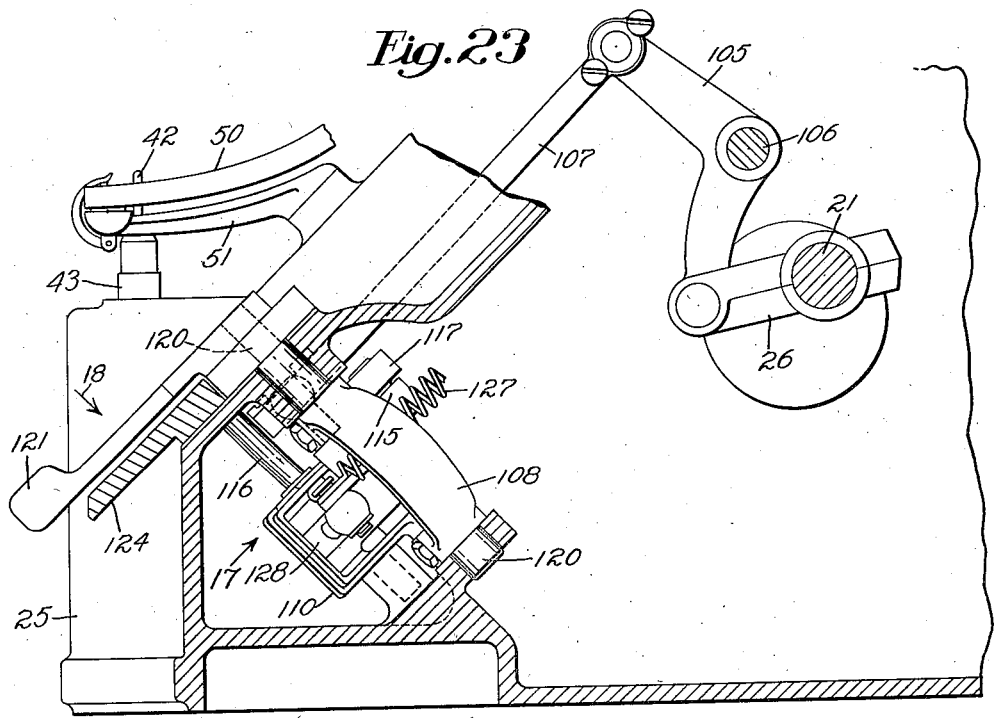
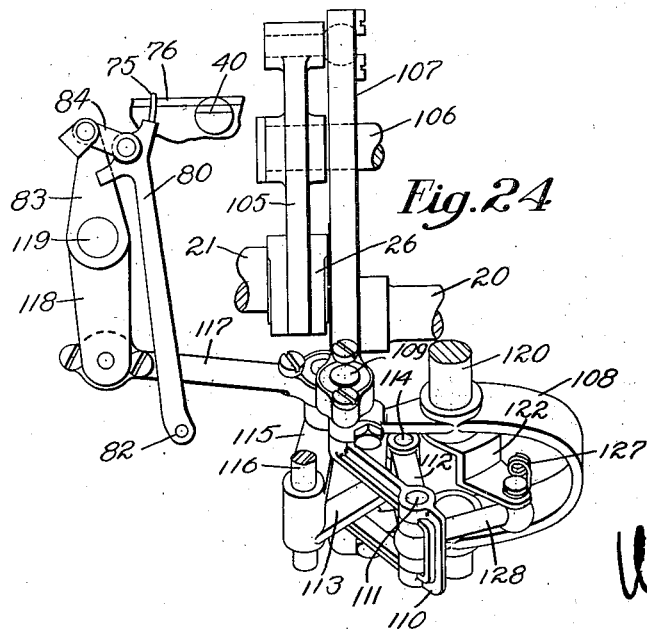
Inventor
Clyde L. Knott
By his Attorney Patented June 22, 1948

2,443,682

UNITED STATES PATENT OFFICE 2,443,682

EYELETING MACHINE

Clyde L. Knott, Beverly, Mass., assignor to United Shoe Machinery Corporation, Flemington, N. J., a corporation of New Jersey Application December 20, 1944, Serial No. 568,947

12 Claims. (Cl. 218—15)

The purpose of the present invention is to provide an automatic eyeleting machine of the work-feeding type in which one rotary driven crank will operate a plurality of mechanisms; viz., one for punching holes in the work, one for inserting and clenching eyelets, and one for feeding the work step by step. These mechanisms, as organized in the illustrated machine, provide for keeping the work at one station while punching a hole and setting an eyelet therein, and thereafter feeding the work one step with a member that enters the clenched eyelets successively at the setting locality while the setting tools are both disengaged from the work.

A novel feature provided by the invention involves the problem of timing the strokes of the two eyelet-setting tools, one of which is a combined punch and clenching anvil and the other of which takes an eyelet from a raceway and inserts it into the work. Despite the fact that both of them derive their motions from one crank and one connecting rod, their connections with the latter are so organized as to move the combined punch and anvil to the eyelet-setting locality ahead of the eyelet-inserting tool and maintain it at that locality until the other tool has inserted and clenched an eyelet, after which both tools are retracted at the same time.

Another novel feature is embodied in means for operating the work-feeding member with compounded motions both derived from the same crank that actuates the setting tools. One of the compounded motions is utilized to move a point of the feeding member into and out of a clenched eyelet, and the other is utilized to move the feeding member along its feeding path. These motions cause the point of the feeding member to travel in an orbital path.

Still another novel feature is embodied in two linkages both operated by a common crank, one of which is arranged to shift a punch-bed to and from alinement with the punch in coordination with the timing of the punch, and the other to shift a raceway to and from the path of the eyelet-inserting tool in coordination with the strokes of that tool.

Referring to the drawings,

Fig. 1 is a vertical section of an eyeleting machine embodying the invention, with some elements omitted, the front of the machine being at the left and the movable elements standing in their initial positions (see line I—I in Fig. 22);

Fig. 2 is a similar view of the presser foot and its mounting in a plane slightly to the left of that in Fig. 1;

Fig. 3 is a sectional elevation including two entire linkages and some elements of a third linkage all operated by a common crank, the plane of the section being the same as that of Fig. 21 and the elements standing at their initial positions as in Fig. 1;

Fig. 4 is similar to Fig. 3 except that it represents the stage of a cycle next after the punching operation, when the punch-bed is about to be retracted from alinement with the punch;

Fig. 5 is a similar view of the linkage for shifting the punch-bed (see line V—V in Fig. 22), and represents the same stage of the cycle as that of Fig. 4;

Fig. 6 represents the linkage of Fig. 5 at a stage when the punch-bed is fully retracted;

Fig. 7 is a sectional front elevation (see line VII—VII, Fig. 1) of interconnected linkages for producing orbital motion of the work-feeding member, the elements standing at their initial positions;

Fig. 8 is similar to Fig. 7 except that some elements are omitted while those included represent that stage of a cycle when a work-feeding step is about to begin;

Figs. 9 and 10 are sectional elevations of a linkage for operating the raceway, the direction of view being the same as that of Fig. 1;

Figs. 11 and 12 are inclined plan views of the raceway linkage as viewed in the direction of the arrow in Fig. 13. Figs. 9 and 11 represent one position of the linkage while Figs. 10 and 12 represent another;

Fig. 13 is a sectional elevation including the delivery end of the raceway and its carrier;

Fig. 14 is a plan view including the delivery end of the raceway and the setting tool with which it cooperates;

Fig. 15 is a side elevation including the hopper and the raceway, the direction of view being the same as that of Fig. 1;

Fig. 16 is a plan view in an inclined plane of an intermediate portion of the work-feeding linkage that transmits motion from the portion included in Fig. 3 to the portion included in Figs. 7 and 8;

Fig. 17 is an elevation, partly in section, of the assemblage shown in Fig. 16 (see arrow 17 in Fig. 23).

Fig. 18 is a top plan view (see arrow 18 in Fig. 23) of a manually adjustable member for regulating the length of the work-feeding steps;

Fig. 19 is a plan view similar to Fig. 16 but showing the elements of the linkage at a different stage of their cycle;

Fig. 20 is a sectional view indicated by line XX—XX in Fig. 19;

Fig. 21 is a sectional side elevation (see line XXI—XXI in Fig. 22) including the crank-shaft and portions of the various linkages operated by both cranks thereof;

Fig. 22 is a sectional front elevation including the two crank portions of the operating shaft and two pairs of connecting rods carried by them;

Fig. 23 is a side elevation of the work-feeding linkage looking in the same direction as Fig. 1; and Fig. 24 is a front elevation of the work-feeding linkage.

Referring to Figs. 1 and 22, the crank-shaft 20 includes two crank portions 21 and 22 the centers of which are diametrically opposite each other. The shaft is journaled in bearings 24 secured in spaced cheeks of the frame 25 between which the cranks are located. The crank 21 carries two connecting rods 26 and 27, while the crank 22 carries two other connecting rods 28 and 29. These two cranks and two pairs of connecting rods provide all the motions needed to punch holes in the work, insert the eyelets, and feed the work.

One linkage actuated by the crank 21 is arranged to operate a plunger 30 by which an eyelet-setting tool 31 of common design is carried. This tool includes a tubular punch 32 projecting from its upsetting shoulder. The plunger 30 has bearings in the frame 25 and its operating linkage comprises the connecting rod 27, a bell-crank 33, a toggle 34, and a pair of links 35 connecting the bell-crank and the knee of the toggle. The toggle and the frame 25 are connected by a fixed fulcrum pin 36 while the plunger and the toggle are connected by a pivot pin 37. The fulcrum pin 38 of the bell-crank is fixed in the frame 25. Considering a line intersecting the axes of the pins 36 and 37 as the dead center line of the toggle, the linkage above described is designed to shift the knee of the toggle across and beyond the dead center line in opposite directions from the latter in each revolution of the crank-shaft.

In Fig. 1 an arrow indicates the direction of rotation of the crank-shaft, and a broken line O indicates the initial positions of the centers of the cranks. As the crank 21 travels from its initial position (Figs. 1 and 3) to that shown in Fig. 4, it shifts the knee of the toggle across and beyond the dead center line, thereby depressing the punch 32 into engagement with a punch-bed 40 and thereafter raising the punch enough to relieve all the punching pressure, but not far enough to withdraw the punch from a workpiece. At this stage retractory movement of the punch-bed begins. A linkage for shifting the punch-bed to and from its operative position in line with the punch is hereinafter described.

While the knee of the toggle is at the right of its dead center line (Fig. 4) an eyelet is inserted into the work by another linkage to be described, the barrel of the eyelet being guided by the punch. The ingoing eyelet reaches its highest position when the knee of the toggle 34, now moving from right to left, again crosses its dead center line, and at this point in the cycle the clenching of the eyelet is completed. Thereafter, the toggle retracts the punch out of the clenched eyelet and a considerable distance above it before the cycle of the crank-shaft is completed.

The eyelets are inserted by a setting tool 41 of common design provided, as usual, with a spring-pressed spindle 42 for picking the eyelets from a raceway 50. This tool is carried by a plunger 43 located in line with the plunger 30 and arranged in bearings in the frame 25. The linkage for operating the plunger 43 includes an ear 27a on the connecting rod 27, a lever 44, a pair of links 45 connecting the rod 27 and the lever, and a pair of links 46 connecting the plunger and the lever. The fulcrum pin 47 of the lever is fixed in the frame 25. This linkage, because of the relations of its component elements, postpones the completion of the up-stroke of the plunger 43 until the toggle 34 is straightened the second time in each cycle.

While the plunger 43 is near the lower limit of its range of travel an eyelet e (Fig. 14) is presented to the spindle 42 by an angularly movable raceway 50 located at the right of the plunger. The upper end of the raceway is nested in an opening in a hopper 150 and is supported by a flat surface inside the hopper, but the lower end is reciprocated sidewise by a linkage including an arm 51 (Fig. 13). This end of the raceway is carried by a ball 48 nested in a hemispherical socket 49 in the arm 51 and in a similar socket in the raceway. A spring clip 52 attached to the arm by a hinge-pin 59 is arranged to maintain assembled relation of the ball-and-socket elements, the raceway having a small bore to receive a retaining spur 63 carried by the free end of the clip. The arm 51, a shaft 53 formed thereon, and an arm 54 secured to the shaft constitute a bell-crank of which the shaft is journaled in bearings in the frame 25. The raceway linkage also includes (Figs. 9 to 12) a radius arm 55, a link 56 connecting the arms 54 and 55, a lever 57, a link 58 connecting the latter and the arm 55, and the connecting rod 29 carried by the crank 22 for rocking the lever 57 about a fixed fulcrum pin 60. The arm 55 is secured to a fulcrum pin 64 journaled in the frame 25. A ball-end pin 61 fastened to the arm 54 is seated in a spherical socket in the link 56, while another ball-end pin 62 fastened to the arm 55 is seated in another spherical socket in that link. Figs. 10 and 12 represent the stage when the eyelet e at the delivery end of the raceway is in line with, and slightly above, the spindle 42, while Figs. 9 and 11 represent another stage when the raceway is retracted out of the path of the setting tool 41.

The crank 22 also operates another linkage (Figs. 1, 5 and 6) for shifting the punch-bed 40 to and from its operative position. This linkage comprises the connecting rod 28, a lever 65, and two links 66 and 67 connected in series by a pivot pin 68. This pin is mounted in a radius arm 69 and thereby constrained to travel in an arc about the axis of an anchoring pivot 70 on which the arm 69 is mounted. The link 67 and the punch-bed 40 have a pivotal connection. The punch-bed has a cylindrical body the upper segment of which is ground off to provide a flat work-supporting face (Fig. 7). A bore in the frame 25 provides a bearing for the punch-bed. The pivot pin 71 extending through the connecting portions of the punch-bed and the link 67 extends also through a closely fitting hole in the head of a pin 72 that projects radially therefrom and has telescopic engagement with a socket member 73 arranged to rock on a fixed pivot 74. The effect of these telescopic members is similar to that of a spline arranged to maintain the flat work-supporting face of the punch-bed in a plane parallel with the end of the punch, without depending upon the operating linkage for that purpose.

Fig. 5 represents that stage in the cycle when the punch-bed is about to be retracted from alinement with the punch after a punching operation, while Fig. 6 represents a later stage when the punch-bed has been retracted as far as it will go. The linkage for shifting the punch-bed is designed to provide a relatively long period during which the punch-bed is clear of the path of the setting tool 41, and a relatively short period during which it projects into that path. The lever 65 and the link 66 form a toggle the arrangement of which reduces the movement of the punch-bed to a negligible extent during that portion of a cycle when the punch 32 is penetrating the work. The knee of this toggle and the knee of the toggle 34 reach their respective dead-center positions at the same time during the punching period (compare Figs. 4 and 5 which represent both knees leaving their dead-center positions).

After an eyelet has been inserted and clenched the setting tools 31 and 41 are both retracted from it, the eyelet remaining at the setting locality only until it is engaged by an awl-like feeding member 75 (Figs. 7 and 8) that enters the eyelets successively and feeds the work from right to left with one step for each revolution of the crankshaft. The work is supported elsewhere than at the setting locality by a table 76 affixed to the frame 25 and provided with an opening 77 to receive the setting tool 41 and the feeding member 75. A presser-foot 78 (Fig. 2) cooperates with the table 76 to clamp the work with light pressure derived from a spring 79, but it may be retracted manually to facilitate placing a work-piece on the table and removing it therefrom.

The work-feeding member 75 (Fig. 7) is affixed to a carrier 80 which is carried up and down by a bell-crank 81 to which it is connected by a pivot pin 82. The carrier is also rocked about the pin 82 by a feed linkage that includes an oscillatory arm 83, a connecting link 84, and pivot pins 85 and 86. The fulcrum pin 87 of the bell-crank 81 remains stationary while the machine is in operation, but it may be depressed manually when the machine is stopped. The purpose and effect of depressing it are to withdraw the member 75 from an eyeleted work-piece. The plunger 43 is utilized to move the feeding member 75 up and down, and for this purpose the plunger and the bell-crank 81 are connected by a link 88. These elements are so organized that the plunger will rise some distance from its lowest position (Fig. 7) before the member 75 starts to descend from its highest position. This timing of the member 75 enables the latter to remain in a clenched eyelet until the punch 32 has descended far enough to penetrate a work-piece. Again, the plunger 43 will descend some distance from its highest position (Fig. 8) before the member 75 rises to engage the work. The member 75 is thus maintained out of contact with the under side of the work-piece while moving into line with the clenched eyelet at the setting locality.

To provide for lifting the presser-foot 78 when the feeding member 75 is depressed manually, three arms 90, 96 and 102 and a finger 23 (Figs. 1 and 7) are affixed to a rock-shaft 89 and the latter is journaled in the frame 25. The arm 96 provides for rocking the shaft, the arm 102 carries the fulcrum pin 87 and the bell-crank 81, while the arm 90 provides for lifting the presser-foot. The finger 23 has no function in the operation of the machine but, by engaging a surface on the frame 25, affords a setting-up adjustment for establishing the normal position of the fulcrum pin 87. A link 91 connects the arm 90 and a lever 92 for which the pin 38 serves as a fulcrum. The forward end of the lever 92 is arranged to lift a sleeve 93 affixed to the stem 94 of the presser-foot, but is normally held against a surface of the frame 25 by a tension spring 95.

A link 97 connects the arm 96 and an arm 98 affixed to a rock-shaft 100. Another arm 99 affixed to this rock-shaft may be connected to the heel end of a treadle (not shown) by a rod 101. These connections are referred to in a later portion of this description which deals with utilizing the same treadle to control a clutch.

The feeding motion of the member 75 is transmitted from the crank 21 (Figs. 3 and 4) to the arm 83 (Figs. 7 and 8) by a linkage that provides for regulating the length of the feeding steps imparted to the work. This linkage includes the connecting rod 26, a lever 105 mounted on a fulcrum pin 106 having a fixed center, a link 107, a yoke 108 (Fig. 17), a yoke 110 nested in the yoke 108 and connected thereto by trunnions 109, a yoke 112 nested in the yoke 110 and connected thereto by a pivot pin 111, an arm 113 connected to the yoke 112 by a pivot pin 114, an arm 115 connected to the arm 113 by an integral hub mounted on a rock-shaft 116, a link 117 connecting the arm 115 and an arm 118 (Fig. 7), and a rock-shaft 119 connecting the arms 118 and 83. The outside yoke 108 (Fig. 17) is mounted on a pair of trunnions 120 journaled in the frame 25. The upper trunnion of this pair carries two arms 121 and 122, both affixed thereto, their purpose being to regulate the length of the feeding steps by shifting a pivot pin 123 carried by the arm 122. The arm 121 overlies a fixed indexing plate 124 in which many holes 125 are bored to receive a removable indexing pin 126. A tension spring 127 attached to the pivot pin 123 normally holds the arm 121 against the pin 126 wherever the latter may be located in the plate 124. A link 128 connects the pivot pins 123 and 111. One of the trunnions 109 (Fig. 20) has a ball end for connection (Fig. 3) with the link 107 from which the feeding motion is received.

Referring to the assemblage shown in Fig. 16, the link 107 supplies the feed motion and the link 117 delivers a regulated quantity thereof to the arm 118. This assemblage has three fixed centers, viz., 120, 116 and 123, except that 123 may be shifted by manual adjustment to regulate the quantity of the motion received by the link 117. The link 107, the trunnions 109 and the outside yoke 108 all have to-and-fro motions of constant amplitude under all conditions of operation. The intermediate yoke 110 transmits the motions of the trunnions 109 to the pivot pin 111 which is constrained by the link 128 to travel in an arc about the fixed center 123. The yoke 112 transmits motion from the pin 111 to the pin 114 which travels in an arc about the fixed center 116. The resultant angular motion of the arm 115 determines the length of the strokes imparted to the output link 117, and the extent thereof can be reduced by adjusting the regulator 121 and the arm 122 (Fig. 18) with anticlockwise movement. Every change of location of the pin or center 123 shifts the arcuate path of the pin 111 and modifies not only the angular relation of the link 128 and the yoke 110, but also the angular relation of the yoke 112 and the arm 113.

Figs. 19 and 20 show the position of the parts at that stage of a cycle when the tip of the feeding member 75 has been thrust into a clenched eyelet at the setting locality and is about to begin its feeding stroke to the left. At this stage the pin 114 is in line with the trunnions 109 regardless of the location of the adjustable center 123. The significance of this alined relation is that it maintains a constant starting point for every feeding stroke of the member 75, despite variations in the length of the feeding strokes due to changing the location of the center 123.

The crank shaft 20 is provided with a clutch (not shown) to be controlled by the treadle hereinbefore mentioned. If desired, the toe end of the treadle may be connected to the clutch, and the heel end may be connected to the rod 101 (Fig. 1). In that event, depressing the heel end will depress the work-feeding member 75 and raise the presser foot, but depressing the toe end will trip the clutch.

When the crank-shaft 20 stands at its initial position (Fig. 1), the punch 32 stands at an intermediate point in its down-stroke; the punch-bed 40 stands at an intermediate point in its forward stroke; the lower setting tool stands at its lowest point; the delivery end of the raceway stands almost but not quite in line with the spindle 42; and the feeding member 75 stands at an intermediate point in its feeding stroke, but relatively near the terminal limit thereof. When the machine is tripped into operation the crank-shaft 20 rotates clockwise, starting from the zero position (Fig. 1). The crank 22 and the connecting rod 28 rock the lever 65 about its fulcrum 60 and thereby operate the links 66 and 67 which first complete the forward travel of the punch-bed and thereafter retract the punch-bed from the path of the setting tool 41. Meanwhile, the crank 22 and the connecting rod 29 rock the lever 57 (Fig. 10) about its fulcrum 60 and thereby operate the links 58 and 56 and the bell-crank 54, 51 (Fig. 12) first to shift the delivery end of the raceway 50 into line with the spindle 42 and thereafter out of the path of the setting tool 41 (Figs. 9 and 11) but not until the spindle has risen through an eyelet in the raceway.

During the early part of each cycle the crank 21, the connecting rod 27, the ear 27a and the links 45 (Fig. 1) depress the rear end of the lever 44, thereby rocking the lever about its fulcrum 47 and raising its forward end to which the plunger 43 is connected by the links 46. The spindle 42, which is carried by the plunger 43, is thereby thrust through an eyelet in the raceway. During the same period of the cycle the crank 21 and the connecting rod 27 rock the bell-crank 33 clockwise about its fulcrum 38. The knee of the toggle 34 which is connected to the bell-crank 33 by a link 35 is thereby shifted across its dead-center position to the position represented in Fig. 4. The toggle thus depresses the punch 32 (Fig. 3) against the punch-bed 40 to provide a hole in the work for the ingoing eyelet on the spindle 42, but while the crank 21 and the lever 44 continue to raise the plunger 43 the crank 22 and the linkage shown in Fig. 5 retract the punch-bed to the position shown in Fig. 6.

When the plunger 43 reaches its highest position (Fig. 8), slightly above the level of the punch-bed 40, the ingoing eyelet is clenched by the upper tool 31; whereupon the latter is retracted by the plunger 30, the toggle 34, the link 35, the bell-crank 33, the connecting rod 27 and the crank 21 while the lower tool 41 is retracted by the plunger 43, the links 46, the lever 44, the links 45, the connecting rod 27 and the crank 21.

Meanwhile, the work-feeding member 75, initially raised as in Fig. 7, is drawn down by the plunger 43 as the latter rises, and subsequently raised as the plunger descends. The motions of the plunger are communicated to the feeding member by the link 88, the bell-crank 81 and the carrier 80.

While the tip of the feeding member 75 is below the level of the table 76 it moves from left to right with motion derived from the crank 21 (Fig. 3) and transmitted by the connecting rod 26, bell-crank 105, link 107, trunnions 109, yoke 108, yoke 110, yoke 112, bell-crank 113, 115, link 117, arm 118, rock-shaft 119, arm 83 and link 84 to the carrier 80. Before the feeding member 75 reaches a point in line with, and below, the eyelet-setting locality the tool 41 descends far enough to remove the spindle 42 from its path. Now, the feeding member rises with movement derived from the tool 41, enters the clenched eyelet and moves from right to left, thereby feeding the work.

Having described my invention, what I claim as new and desire to secure by Letters Patent of the United States is:

1. An eyeleting machine comprising a combined punch and eyelet-setting tool, a punch-bed, means arranged to shift the punch-bed to and from alinement with the punch, a rotary driven crank, means actuated by said crank for carrying the punch to and from the punch-bed, and means also actuated by said crank for clenching an eyelet against said tool.

2. An eyeleting machine comprising a combined punch and eyelet-setting tool, a punch-bed, means arranged to shift the punch-bed to and from alinement with the punch, means including a toggle for operating the punch, a rotary driven crank, means actuated by said crank for operating said toggle, and means also actuated by said crank for clenching an eyelet against said tool.

3. An eyeleting machine comprising a combined punch and eyelet-setting tool, a punch-bed, means arranged to shift the punch-bed to and from alinement with the punch, a rotary driven crank, a connecting rod carried thereby, means actuated by said rod for operating the punch, and means also actuated by said rod for clenching an eyelet against said tool.

4. An eyeleting machine comprising a combined punch and eyelet-setting tool, a punch-bed, means arranged to shift the punch-bed to and from alinement with the punch, means including a toggle for operating the punch, a rotary driven crank, a connecting rod carried thereby, means actuated by said rod for operating said toggle, and means also actuated by said rod for clenching an eyelet against said tool.

5. An eyeleting machine comprising a combined punch and eyelet-setting tool, means including a toggle for operating the punch, a punch-bed arranged to be engaged by the punch when said toggle is straight, means for moving the punch-bed to and from alinement with the punch, a rotary driven crank, means actuated by said crank for operating said toggle, and means also actuated by said crank for clenching an eyelet against said tool when said toggle is straight.

6. An eyeleting machine comprising a work-supporting table, a rotary driven crank, means actuated by said crank for inserting and clenching eyelets successively, a work-feeding member formed and arranged to enter the barrel of a clenched eyelet installed in a work-piece on the table, and means actuated by said crank for operating said feeding member to engage the clenched eyelets successively at the setting locality and feed them away from it.

7. An eyeleting machine comprising a work-supporting table, a rotary driven crank, means actuated by said crank for inserting and clenching eylets successively, said means including a plunger by which the eyelets are carried to the setting locality, a work-feeding member formed and arranged to enter the barrel of a clenched eyelet installed in a work-piece on the table, means actuated by said plunger for thrusting a portion of said feeding member into a clenched eyelet at the setting locality, and means actuated by said crank for moving said feeding member back and forth in coordination with its motions derived from said plunger and thereby to carry its eyelet-engaging portion in an orbital path.

8. An eyeleting machine comprising a work-supporting table, a punch-bed, a rotary driven crank, means actuated by said crank for punching holes successively in a work-piece on the punch-bed and clenching eyelets in them at the punching locality, means for shifting the punch-bed to and from that locality, a work-feeding member formed and arranged to enter the barrel of a clenched eyelet installed in the work-piece, and means actuated by said crank for operating said feeding member to engage the clenched eyelets successively at the punching locality and feed them away from it.

9. An eyeleting machine comprising a punch-bed, a combined punch and eyelet-setting tool, a rotary driven shaft having two cranks, toggle means actuated by one of said cranks for shifting the punch-bed to and from alinement with the punch, means actuated by the other one of said cranks for operating the punch, and means actuated by one of said cranks for inserting and cleaning an eyelet against said tool while the punch is in a work-piece.

10. An eyeleting machine comprising a punch-bed, a combined punch and eyelet-setting tool, a raceway for supplying eyelets, a rotary driven shaft having two cranks, means actuated by one of said cranks for shifting the punch-bed and the raceway to and from alinement with the punch, means actuated by the other one of said cranks for operating the punch, and means also actuated by said other crank for transferring an eyelet from the raceway and clenching it against said tool while the punch is in a work-piece.

11. An eyeleting machine comprising a work-supporting table, a combined punch and eyelet-setting tool, a punch-bed, an eyelet-inserting tool having an eyelet-engaging spindle, a raceway for presenting eyelets to the spindle, a work-feeding member having a point arranged to project through a clenched eyelet in a work-piece, a rotary driven shaft having two cranks, four connecting rods arranged two by two on said cranks, means actuated by one of said rods for operating the punch, means actuated by the same one of said rods for operating the eyelet-inserting tool and for moving the point of the feeding member into and out of the clenched eyelets successively, means actuated by another one of said rods for moving the feeding member back and forth in its path of feed, means actuated by still another one of said rods for shifting the punch-bed to and from alignment with said tools, and means actuated by another one of said rods for moving the raceway to and from alinement with said tools.

12. An eyeleting machine comprising a work-supporting table, a punch-bed, a combined punch and eyelet-setting tool, a raceway for supplying eyelets, a work-feeding member formed and arranged to engage the interior of a clenched eyelet to feed the work while the punch is disengaged therefrom, a rotary driven shaft having two cranks, means actuated by one of said cranks for shifting the punch-bed and the raceway to and from alinement with the punch, means actuated by the other one of said cranks for operating the punch, means actuated by said other crank for transferring an eyelet from the raceway and clenching it against said tool, and means actuated by said other crank for moving the eyelet-engaging portion of said feeding member in an orbital path to feed the work.

CLYDE L. KNOTT.

REFERENCES CITED

The following references are of record in the file of this patent:

UNITED STATES PATENTS

| Number | Name | Date |
|---|---|---|
| 1,689,949 | Lautenschlager | Oct. 30, 1928 |
| 2,183,069 | Gookin | Dec. 12, 1939 |
| 2,300,499 | Gookin | Nov. 3, 1942 |
| 2,374,345 | Gookin | Apr. 24, 1945 |

Certificate of Correction

Patent No. 2,443,682.　　　　　　　　　　　　　　　　　　　　　　　　June 22, 1948.

CLYDE L. KNOTT

It is hereby certified that error appears in the printed specification of the above numbered patent requring correction as follows: Column 9, line 47, claim 9, for the word "cleaning" read *clenching*; and that the said Letters Patent should be read with this correction therein that the same may conform to the record of the case in the Patent Office.

Signed and sealed this 16th day of November, A. D. 1948.

[SEAL]

THOMAS F. MURPHY,
*Assistant Commissioner of Patents.*